United States Patent
Huang et al.

(10) Patent No.: US 10,820,371 B1
(45) Date of Patent: Oct. 27, 2020

(54) HARDWARE DATA TRANSPORT IN WIRELESS DATA TRANSCEIVER

(71) Applicant: Marvell International Ltd., Hamilton (BM)

(72) Inventors: Frank Huang, Dublin, CA (US); Tao Song, Shanghai (CN); Xinyu Zang, Palo Alto, CA (US); Zheng Cao, Union City, CA (US); James Kang-Wuu Jan, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/422,298

(22) Filed: May 24, 2019

Related U.S. Application Data

(60) Provisional application No. 62/676,760, filed on May 25, 2018.

(51) Int. Cl.
| | | |
|---|---|---|
| *H04W 80/02* | (2009.01) | |
| *H04W 28/06* | (2009.01) | |
| *H04W 92/10* | (2009.01) | |
| *H04W 88/08* | (2009.01) | |
| *H04L 29/12* | (2006.01) | |

(52) U.S. Cl.
CPC ......... *H04W 80/02* (2013.01); *H04L 61/2061* (2013.01); *H04W 28/06* (2013.01); *H04W 88/08* (2013.01); *H04W 92/10* (2013.01)

(58) Field of Classification Search
CPC ..... H04W 80/02; H04W 28/06; H04W 92/10; H04W 88/08; H04L 61/2061
See application file for complete search history.

(56) References Cited

U.S. PATENT DOCUMENTS

| 7,296,100 B1 * | 11/2007 | Venkatesh | G06F 13/128 |
| | | | 710/23 |
| 2007/0230493 A1 * | 10/2007 | Dravida | H04L 47/621 |
| | | | 370/412 |
| 2008/0008154 A1 * | 1/2008 | Mizukoshi | H04L 12/417 |
| | | | 370/347 |
| 2010/0202470 A1 * | 8/2010 | Luan | H04L 47/29 |
| | | | 370/412 |
| 2013/0215895 A1 * | 8/2013 | Feng | H04L 12/4645 |
| | | | 370/392 |
| 2016/0234317 A1 * | 8/2016 | Frachtenberg | H04L 69/12 |

\* cited by examiner

*Primary Examiner* — Paul H Masur

(57) ABSTRACT

A wireless data transceiver includes a media access controller (MAC) configured to receive an inbound data packet from an air interface and to buffer the inbound packet for transport to a host, and to receive an outbound data packet from elsewhere in the transceiver and to transfer the outbound packet to the air interface. The transceiver further includes a host interface configured to receive the inbound packet transported from the MAC and to transfer the inbound packet to the host, and to receive the outbound packet from the host for transfer to the MAC. The transceiver also includes transport controller circuitry configured to execute instructions to generate and transfer management packets. In addition, the wireless data transceiver includes hardware data transport circuitry for transporting the inbound packet from the MAC to the host interface, and for transporting the outbound packet from the host interface to the MAC, without executing instructions.

20 Claims, 5 Drawing Sheets

HARDWARE DATA TRANSPORT IN WIRELESS DATA TRANSCEIVER

CROSS REFERENCE TO RELATED APPLICATION

This disclosure claims the benefit of commonly-assigned U.S. Provisional Patent Application No. 62/676,760, filed May 25, 2018, which is hereby incorporated by reference herein in its entirety.

FIELD OF USE

This disclosure relates to the transport of data between a media access controller and a host interface in a wireless data transceiver. More particularly, this disclosure relates to hardware data transport between the media access controller and the host interface.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

A data transceiver such as that used in a wireless system operating under the IEEE 802.11 protocol, commonly referred to as "Wireless Fidelity" or "WiFi," includes a media access controller (MAC) that interfaces with the wireless channel, and a host interface which may be, for example, a Universal Serial Bus (USB), Peripheral Component Interconnect-Express (PCIe), or Secure Digital Input Output (SDIO), interface. Traditionally, firmware has been provided to move packets between the MAC and the host interface.

SUMMARY

A wireless data transceiver according to implementations of the subject matter of this disclosure includes a media access controller configured to receive an inbound data packet from an air interface and to buffer the inbound data packet for transport to a host, and to receive an outbound data packet from elsewhere in the wireless data transceiver and to transfer the outbound data packet to the air interface. The wireless data transceiver further includes a host interface configured to receive the inbound data packet transported from the media access controller and to transfer the inbound data packet to the host, and to receive the outbound data packet from the host for transfer to the media access controller. The wireless data transceiver also includes transport controller circuitry configured to manage the wireless data transceiver, including generating a management packet and transferring the management packet to the media access controller for transmission. The transport controller circuitry includes processing circuitry configured to execute instructions, including instructions to perform the transferring of the management packet to the media access controller for transmission. In addition, the wireless data transceiver includes hardware data transport circuitry for transporting the inbound data packet from the media access controller to the host interface, and for transporting the outbound data packet from the host interface to the media access controller, without executing instructions to perform the transporting of the inbound data packet or the transporting of the outbound data packet.

In a first implementation of such a wireless data transceiver, the transport controller circuitry includes processing circuitry configured to execute instructions stored in firmware. That processing circuitry may be a central processing unit, a microprocessor, or a microcontroller.

A second implementation of such a wireless data transceiver further includes buffer memory including a plurality of buffer locations configured to store inbound data packets and outbound data packets, and address memory configured to store a pool of addresses of available buffer locations.

In that second implementation, the hardware data transport circuitry may include a transmit read pointer configured to select an address from the pool of addresses of available buffer locations, and to communicate the selected address to a transmit queue in the media access controller, and memory circuitry configured to receive the outbound data packet from the host interface and to transfer the outbound data packet to a buffer location indicated by the transmit read pointer, and the media access controller may be configured to read the outbound data packet from the buffer location as indicated by the selected address in the transmit queue, transmit the outbound data packet to the air interface, and release the selected address back to the pool of addresses, and the hardware data transport circuitry may further include a transmit write pointer configured to write the released address back into the pool of addresses.

In a variant of that second implementation, the hardware data transport circuitry may include a controller read pointer configured to select an address from the pool of addresses of available buffer locations, the transport controller circuitry may be configured to generate a management data packet for transfer to the air interface via the media access controller, to transfer the outbound data packet to a buffer location indicated by the controller read pointer, and to communicate the selected address to a transmit queue in the media access controller, the media access controller may be configured to read the controller data packet from the buffer location as indicated by the selected address in the transmit queue, transmit the controller data packet to the air interface, and release the selected address back to the hardware data transport circuitry, and the hardware data transport circuitry may further include a transmit write pointer configured to write the released address back into the pool of addresses.

In another variant of that second implementation, the media access controller may further include a receive read pointer configured to, upon receipt of the inbound data packet from the air interface, select at least one address from the pool of addresses, the media access controller may be configured to store the inbound data packet in a buffer at the at least one address, add the at least one address to a receive queue, and inform the hardware data transport circuitry that the inbound data packet has arrived, and to communicate the at least one address to the hardware data transport circuitry, the hardware data transport circuitry may include memory circuitry configured to read the inbound data packet from the buffer, store the inbound data packet, and forward to inbound data packet to the host interface, the hardware data transport circuitry may further be configured to release the at least one address to the media access controller, and the media access controller may further include a receive write pointer configured to write the released at least one address back to the pool of addresses.

In an instance of that variant, the media access controller may further be configured to inform the transport controller circuitry that the inbound data packet has arrived, and the transport controller circuitry may be configured to validate the inbound data packet.

In that instance, the transport controller circuitry may be configured to determine packet size of the inbound data packet and to inform the host interface of the packet size, and the host interface is configured to request an amount of data from the hardware data transport circuitry based on the packet size.

A method according to implementations of the subject matter of this disclosure for operating a wireless data transceiver including a media access controller, a host interface, transport controller circuitry and hardware data transport circuitry, includes, for an outbound management data packet generated at the transport controller circuitry, at the transport controller circuitry, executing instructions to transfer the management packet to the media access controller, and at the media access controller, receiving the outbound management data packet and transferring the outbound data packet to the air interface, and for an outbound data packet generated at a host, at the host interface, receiving the outbound data packet for transport to the media access controller and transferring the outbound data packet to the hardware data transport circuitry, at the hardware data transport circuitry, transporting the outbound data packet from the host interface to the media access controller, without executing instructions to perform the transporting of the outbound data packet, and at the media access controller, receive an outbound data packet from elsewhere in the wireless data transceiver and transferring the outbound data packet to an air interface.

In a first implementation of such a method, the executing of instructions includes executing instructions stored in firmware.

A second implementation of such a method further includes, for an inbound data packet, at the media access controller, receiving the inbound data packet from an air interface and buffering the inbound data packet for transport to a host, at the hardware data transport circuitry, transporting the inbound data packet from the media access controller to the host interface, without executing instructions to perform the transporting of the inbound data packet, and at the host interface, receiving the inbound data packet transported from the media access controller and transferring the inbound data packet to the host.

A first variant of that second implementation may further include storing at least one of inbound data packets and outbound data packets in buffer memory including a plurality of buffer locations, and storing a pool of addresses of available buffer locations.

That first variant may further include selecting an address from the pool of addresses of available buffer locations, and communicating the selected address to a transmit queue in the media access controller, and receiving the outbound data packet from the host interface and transferring the outbound data packet to a buffer location indicated by a transmit read pointer, at the media access controller, reading the outbound data packet from the buffer location as indicated by the selected address in the transmit queue, transmitting the outbound data packet to the air interface, and release the selected address back to the pool of addresses, and at the hardware data transport circuitry, writing the released address back into the pool of addresses.

That first variant may further include selecting an address from the pool of addresses of available buffer locations, and communicating the selected address to a transmit queue in the media access controller, at the transport controller circuitry, transferring the outbound management data packet to a buffer location indicated by a controller read pointer, at the media access controller, reading the outbound management data packet from the buffer location as indicated by the selected address in the transmit queue, transmitting the outbound management data packet to the air interface, and releasing the selected address back to the hardware data transport circuitry, and at the hardware data transport circuitry, writing the released address back into the pool of addresses.

That first variant may further include, at the media access controller, upon receipt of the inbound data packet from the air interface, selecting at least one address from the pool of addresses, storing the inbound data packet in a buffer at the at least one address, adding the at least one address to a receive queue, informing the hardware data transport circuitry that the inbound data packet has arrived, and communicating the at least one address to the hardware data transport circuitry, at the hardware data transport circuitry, reading the inbound data packet from the buffer, storing the inbound data packet, forwarding the inbound data packet to the host interface, and releasing the at least one address to the media access controller, and at the media access controller, writing the released at least one address back to the pool of addresses.

A second variant of the second implementation may further include informing the transport controller circuitry that the inbound data packet has arrived, and validating the inbound data packet at the transport controller circuitry.

In that second variant, the validating may include determining size of the inbound data packet, and the method may further include informing the host interface, by the transport controller circuitry, of the packet size, and requesting by the host interface, from the hardware data transport circuitry, of an amount of data based on the packet size.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
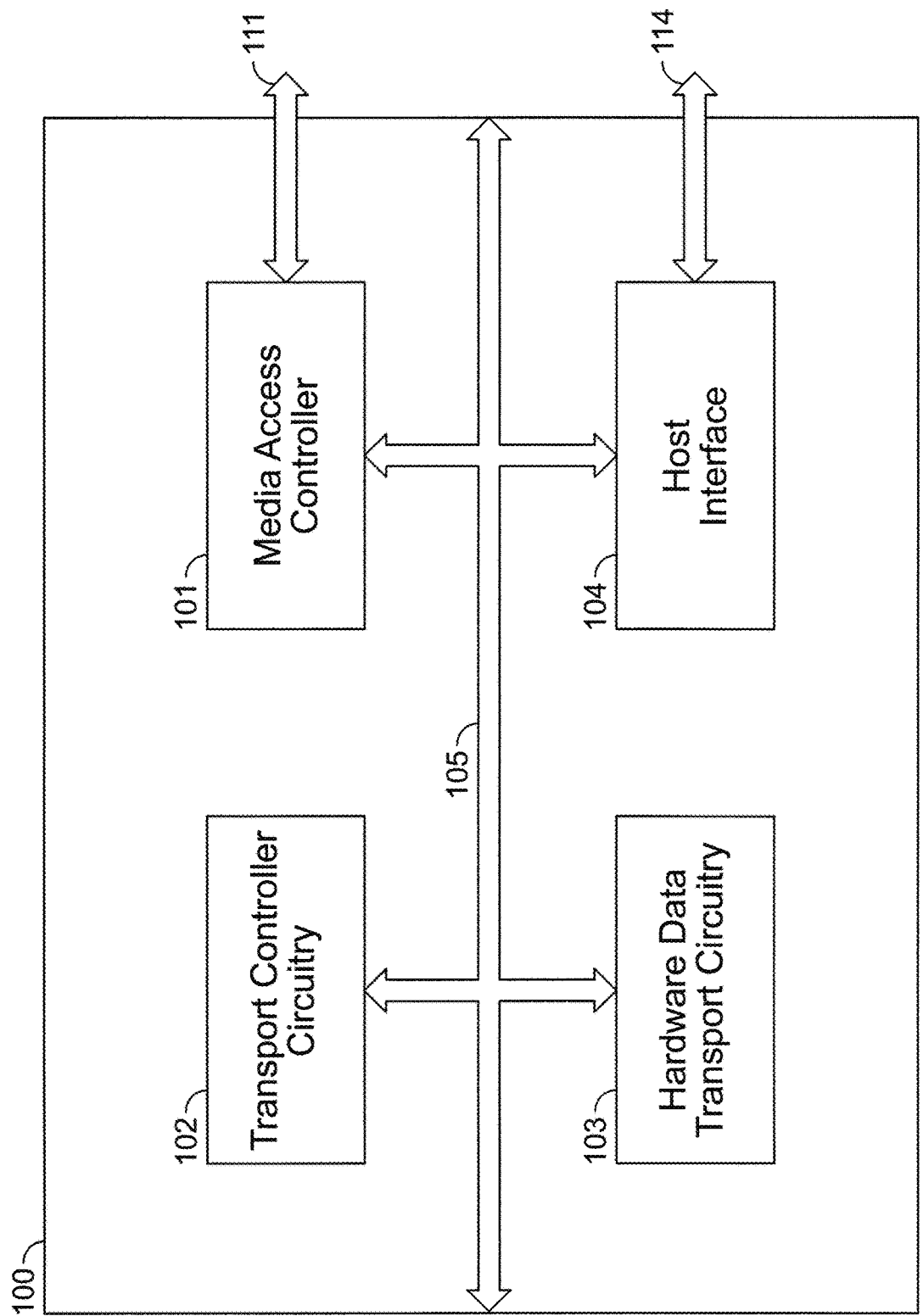
FIG. 1 is a high-level schematic diagram of a wireless data transceiver according to implementations of the subject matter of this disclosure.

The use of firmware to check and transport data packets between a MAC and a host interface can slow the effective rate of data transport as the firmware instructions are being executed. In accordance with implementations of the subject matter of this disclosure, hardware data transport circuitry is provided to handle transport of data packets between the MAC and the host interface of a wireless data transceiver. Hardware data transport circuitry in the wireless data transceiver transports data packets between the media access controller and the host interface more quickly than previously-known transport controller circuitry, which may be based on a CPU, microprocessor or microcontroller, that executes software or firmware to perform the transport functions. In implementations according to the subject matter of this disclosure, the transport controller circuitry also is present to handle management functions.

In implementations according to the subject matter of this disclosure, the hardware data transport circuitry includes a FIFO memory that communicates with the host interface, and a buffer memory that communicates with the media access controller (and/or with an encryption unit, if encryption is used). The buffer memory may be considered as a pool of buffer slots, and the hardware data transport circuitry maintains a corresponding pool of buffer memory addresses.

In some such implementations, in the transmit direction, data from the host is written to the FIFO memory of the hardware transport circuitry. For each packet, the hardware data transport circuitry parses the descriptor in the FIFO memory to determine the size (e.g., the packet length) of the data packet, and then obtains, from the pool of buffer memory addresses, a number of addresses corresponding to a number of buffer memory slots sufficient to hold the data packet. For example, a pointer may indicate the next free address.

The hardware data transport circuitry then writes the data from the FIFO memory into those buffer slots and transfers the data to the media access controller by writing, into the media access controller transmit queue, the address or addresses of the buffer slot or slots in which the data is stored. The media access controller retrieves the data from those buffer slots and transmits the data onto the air interface. The media access controller then notifies the hardware data transport circuitry that the buffer slot addresses can be released. The hardware data transport circuitry then returns the addresses to the pool of addresses (e.g., by updating the pointer into the pool of addresses).

The transport controller circuitry manages the functioning of the transceiver. As part of the management operations, the transport controller circuitry generates its own data to be transmitted. On generation of such management data, the transport controller circuitry obtains, from the pool of addresses, an address or addresses of an available buffer slot or slots. The transport controller circuitry then writes the data into those buffer slots and transfers the data to the media access controller by writing, into the media access controller transmit queue, the address or addresses of the buffer slot or slots in which the data is stored. The media access controller retrieves the data from those buffer slots and transmits the data onto the air interface. The media access controller then advises the transport controller circuitry (e.g., by sending an interrupt) that the data has been transmitted, and that the buffer slot addresses can be released. The transport controller circuitry then returns the addresses to the pool of addresses (e.g., by updating the pointer into the pool of addresses).

Similarly, in some such implementations, in the receive direction, when data is received by the media access controller, the media access controller determines the size (e.g., the packet length) of the data, and then obtains, from the pool of buffer memory addresses, a number of addresses corresponding to a number of buffer memory slots sufficient to hold the data. Again, for example, a pointer may indicate the next free address.

The media access controller then writes the data into those buffer slots and writes the address or addresses of the buffer slot or slots in which the data is stored into a media access controller receive queue. The media access controller then notifies the hardware data transport circuitry that a receive operation has been completed. The hardware data transport circuitry reads, from the media access controller receive queue, the address or addresses of the buffer slot or slots containing received data.

The hardware data transport circuitry then fetches the data from the buffer slot or slots indicated by the address or addresses from the media access controller receive queue into the hardware data transport circuitry FIFO memory, from which the data is transferred to the host interface. The hardware data transport circuitry returns the addresses to the media access controller, which returns to addresses to the pool of addresses (e.g., by updating the pointer into the pool of addresses).

Optionally, in some implementations, when the media access controller notifies the hardware data transport circuitry that a receive operation has been completed, the media access controller also notifies the transport controller circuitry (e.g., via interrupt) that a receive operation has been completed. The transport controller circuitry then validates the data and advises the host interface of the data length. The host interface then requests that specific amount of data from the hardware data transfer circuitry, which is transferred to the host interface from the hardware data transfer circuitry FIFO memory as above.

An implementation of the subject matter of this disclosure may be described with reference to FIGS. 1-6.

The high-level structure of a wireless data transceiver 100, which may be a WiFi transceiver such as that which may be found in a wireless access point or in a client station, according to implementations of the subject matter of this disclosure, is shown in FIG. 1. Wireless data transceiver 100 includes a media access controller (MAC) 101, transport controller circuitry (TCC) 102, hardware data transport circuitry (HDTC) 103, and host interface 104, all interconnected by bus 105. Host interface 104, which, in various implementations, may be a PCIe, USB or SDIO interface, is connected at 114 to a host device (not shown). MAC 101 receives and transmits data wirelessly via an "air interface" at 111.

Figure 2:
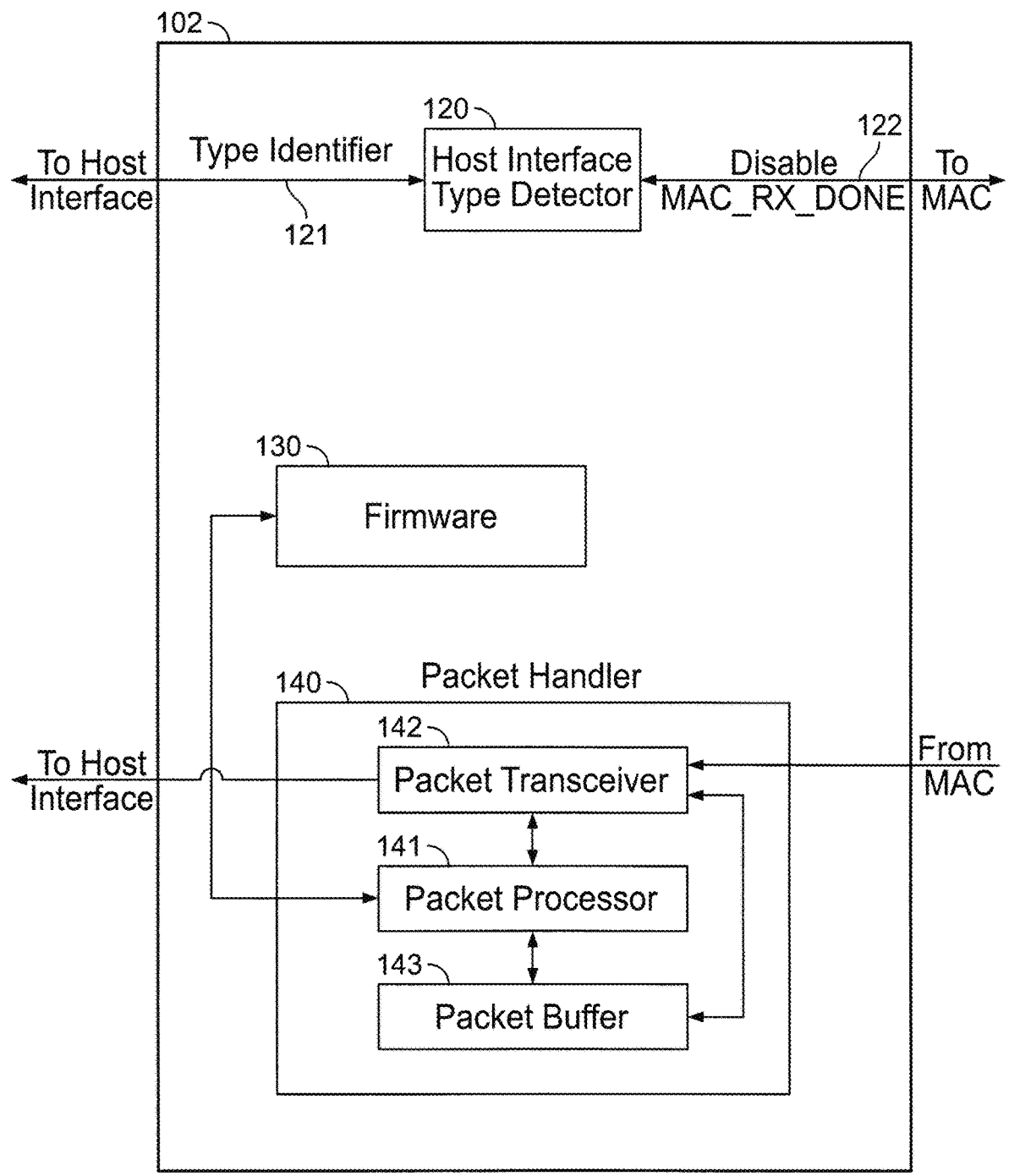
FIG. 2 is a block diagram of an example of transport controller circuitry in the wireless data transceiver of FIG. 1.

In an implementation shown in FIG. 2, transport controller circuitry 102 includes a host interface type detector 120 that, at 121, receives a type identifier signal from host interface 104 via hardware data transport circuitry 103. The type identifier signal indicates what type of interface host interface 104 is—e.g., PCIe, USB or SDIO. In this implementation, if the type identifier signal indicates that host interface 104 is a USB or SDIO interface, then at 122, host interface type detector 120 sends, in that circumstance, a signal to MAC 101 to disable, in that circumstance, the issuance of the MAC_RX_DONE signal that is described below.

Transport controller circuitry 102 also includes a packet handler 140, including a packet processor 141 that executes instructions that may be stored in firmware 130. In some implementations, packet processor 141 is a CPU. In other implementations, packet processor 141 is a microprocessor. In still other implementations, packet processor 141 is a microcontroller. Transport controller circuitry 102 performs management functions for wireless data transceiver 100, using packet processor 141 to execute instructions stored in firmware 130. The management functions in some instances result in the generation of a management data packet, which is communicated by packet transceiver 142 to media access controller 101, for transmission out of wireless data transceiver 100 as described below. Packets also arrive at packet transceiver 142 of packet handler 140, and are stored in packet buffer 143 for processing by packet processor 141.

As described above, in some implementations, instructions executed by transport controller circuitry 102 are stored in firmware 130 for execution by packet processor 141. However, in other implementations, transport controller circuitry 102 is implemented in hardware (e.g., using appropriate logic circuitry, such as a field-programmable gate array). Similarly, in some implementations, the program instructions executed in transport controller circuitry 102 are stored in other types of program memory. Transport controller circuitry 102 will be described hereafter as executing firmware 130 except where otherwise noted. However, implementations other than in firmware are within the scope of this disclosure, and discussion of firmware should not be considered as a limitation on the nature of transport controller circuitry 102.

Figure 3:
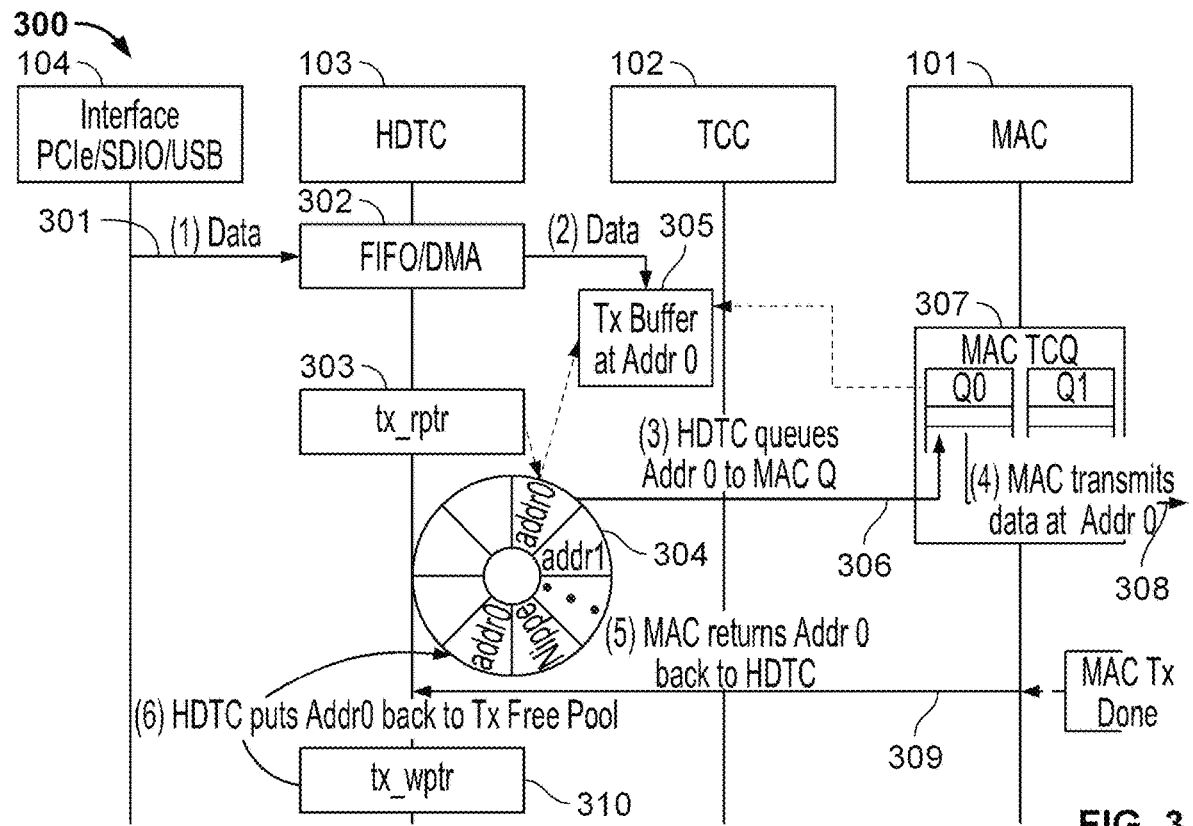
FIG. 3 is a diagram of the data and processing flow for an outgoing data packet according to implementations of the subject matter of this disclosure.

FIG. 3 shows the data and processing flow 300 for an outgoing data packet. The outgoing data packet arrives at 301 from host interface 104 to FIFO/DMA memory 302 of hardware data transport circuitry 103. Using transmit read pointer (tx_rptr) 303, hardware data transport circuitry 103 finds, in address pool 304, an address or addresses of free a buffer slot or slots 305. Hardware data transport circuitry 103 then writes the outgoing data packet into buffer slot or slots 305, and at 306 communicates the addresses of buffer slot or slots 305 to media access controller transmit queue (MAC TCQ) 307. Media access controller 101 transmits the outbound data packet onto the air interface at 308 from the buffer slot or slots 305 whose addresses are indicated in media access controller transmit queue 307. At 309, media access controller 101 advises hardware data transport circuitry 103 that the buffer slot or slots where the outbound data packet was stored are free, and hardware data transport circuitry 103 "returns" those addresses to address pool 304, by pointing transmit write pointer (tx_wptr) 310 to the addresses as free addresses in address pool 304.

Figure 4:
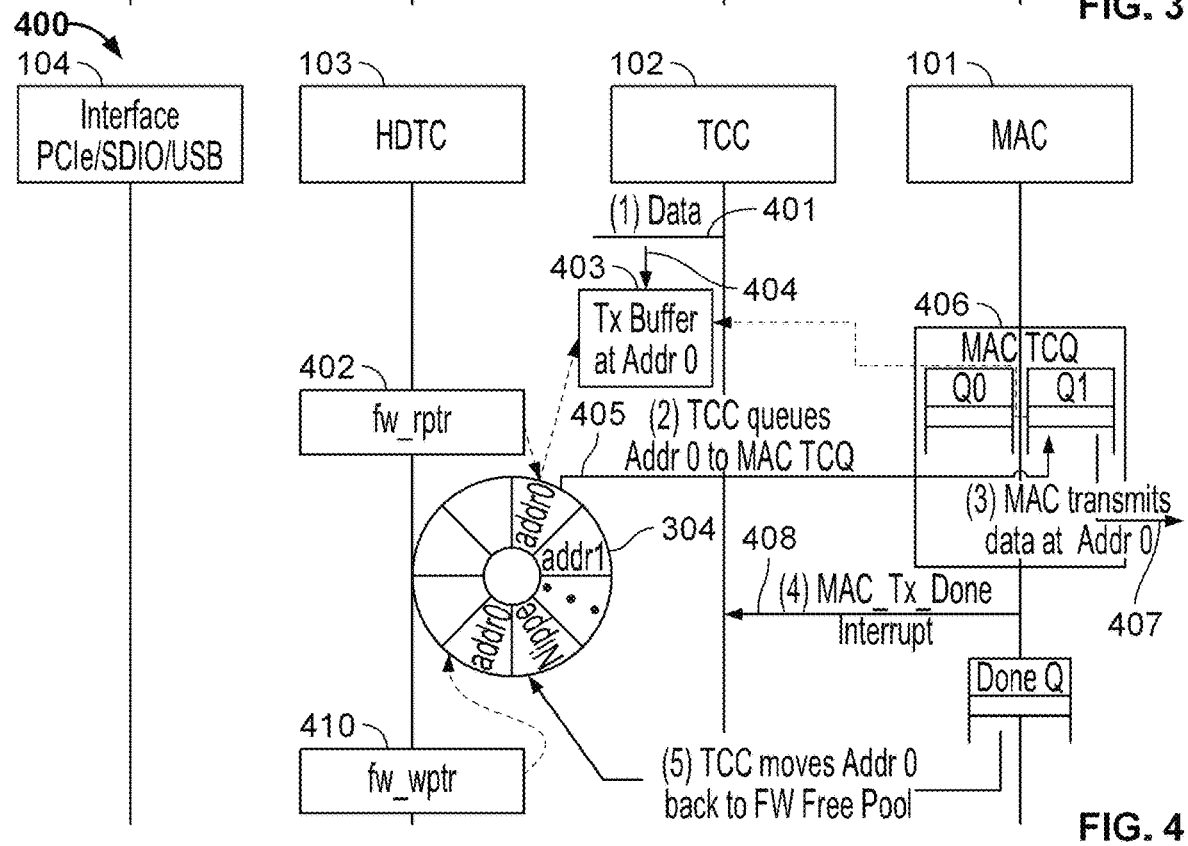
FIG. 4 is a diagram of the data and processing flow for an outgoing management packet according to implementations of the subject matter of this disclosure.

FIG. 4 shows the data and processing flow 400 for an outgoing management data packet. The outgoing management data packet is created at 401 by transport controller circuitry 102. Transport controller circuitry 102 instructs hardware data transport circuitry 103 to use firmware write pointer (fw_wptr) 402 to find, in address pool 304, an address or addresses of a free buffer slot or slots 403. At 404, the outgoing management data packet is written to buffer slot or slots 403 by transport controller circuitry 102, and at 405 transport controller circuitry 102 communicates the addresses of buffer slot or slots 403 to media access controller transmit queue (MAC TCQ) 406. Media access controller 101 transmits the outbound management data packet onto the air interface at 407 from the buffer slot or slots 403 whose addresses are indicated in media access controller transmit queue 406. At 408, media access controller 101 advises transport controller circuitry 102 (e.g., by interrupt) that the buffer slot or slots 403 where the outbound management data packet was stored are free. At 409, transport controller circuitry 102 "returns" those addresses to address pool 304, by pointing firmware write pointer (fw_wptr) 410 to the addresses as free addresses in address pool 304.

Figure 5:
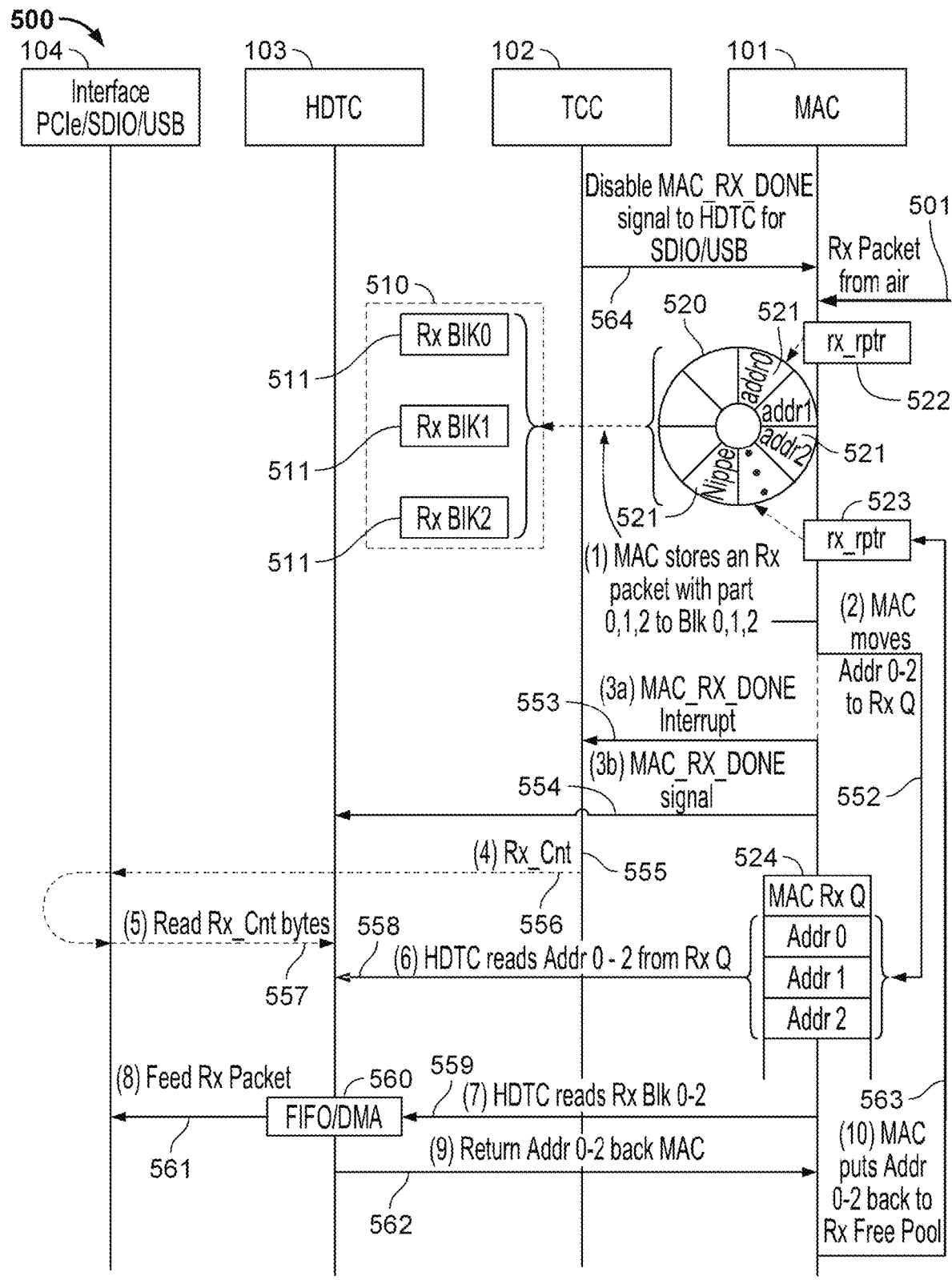
FIG. 5 is a diagram of the data and processing flow for an incoming data packet according to implementations of the subject matter of this disclosure.

FIG. 5 shows the data and processing flow 500 for an incoming data packet. The incoming data packet arrives at MAC 101 via air interface 111 at 501. MAC 101 has access to a buffer 510 having a plurality of available slots or blocks 511. MAC 101 also maintains a pool 520 of available addresses 521 into buffer 510. A receive read pointer (rx_rptr) 522 points to the next available address in pool 520. When a buffer slot 511 is emptied and its address 521 is freed up (see below), a receive write pointer (rx_wptr) 523 is pointed to the freed address so that the availability of the freed address 521 is noted. If rx_rptr 522 and rx_wptr 523 are pointing to the same address, that means the buffer is full, and therefore the incoming data packet cannot be processed. In some implementations, a message to the effect that the data packet cannot be processed is returned via air interface 111 to the transmitter, which will retry the transmission (or not) according to its own protocol.

In the example shown in FIG. 5, the incoming data packet is received at 501. At 502, MAC 101 determines that the incoming data packet will, based on its size, in this example, occupy three blocks 511 (Blk0, Blk1, Blk2) in buffer 510, and obtains, in this example, three addresses (Addr0, Addr1 and Addr2) from pool 520 of available addresses, and associates those addresses with the occupied buffer blocks. At 552, MAC 101 writes the addresses into a Received queue (MAC Rx Q) 524. After the addresses have been written into MAC Rx Q 524, MAC 101 lets transport controller circuitry 102 and hardware data transport circuitry 103 know that MAC 101 has finished processing a received data packet, by sending a MAC_RX_DONE interrupt 553 to transport controller circuitry 102 and a MAC_RX_DONE signal 554 to hardware data transport circuitry 103. If host interface 104 is a USB interface or an SDIO interface, where the host is the controller, transport controller circuitry 102 will have previously, at 564, sent a signal disabling the issuance of MAC_RX_DONE signal 554. In an implementation in which transport controller circuitry 102 is based on logic circuitry instead of firmware, interrupt 553 is replaced by a signal.

After receiving MAC_RX_DONE signal 554, at 558 hardware data transport circuitry 103 reads the addresses (in this example, Addr0, Addr1 and Addr2) from MAC Rx Q 524, and uses those addresses at 559 to access, and read the data from, the three (in this example) blocks 511 (Blk0, Blk1, Blk2) of buffer 510. Hardware data transport circuitry 103 reads the data into FIFO/DMA block 560 in hardware data transport circuitry 103, from which the data packet is fed at 561 by hardware data transport circuitry 103 to host interface 104 to be relayed to the host, as follows.

In some implementations, in response to receiving MAC_RX_DONE interrupt 553, at 555 transport controller circuitry 102 validates the incoming data packet. As part of the validation, the packet data size is determined and sent to host interface 104 a Receive Count signal 556 indicating the size or length (e.g., number of bytes) of the received data packet. The host interface then sends signal 556 to hardware data transport circuitry 103 at 557, requesting the amount of data indicated by signal 556 to be sent to the host.

Alternatively, validation is performed, in some implementations, by hardware data transport circuitry 103 itself, which then sends the data to host interface 104 without any size information.

After hardware data transport circuitry 103 has fed the data packet to host interface 104, then at 562 hardware data transport circuitry 103 returns the addresses (in this example, Addr0, Addr1, Addr2) to MAC 101 which, at 563 returns the addresses, which are now no longer being used, to pool 520 of available addresses for reuse.

Figure 6:
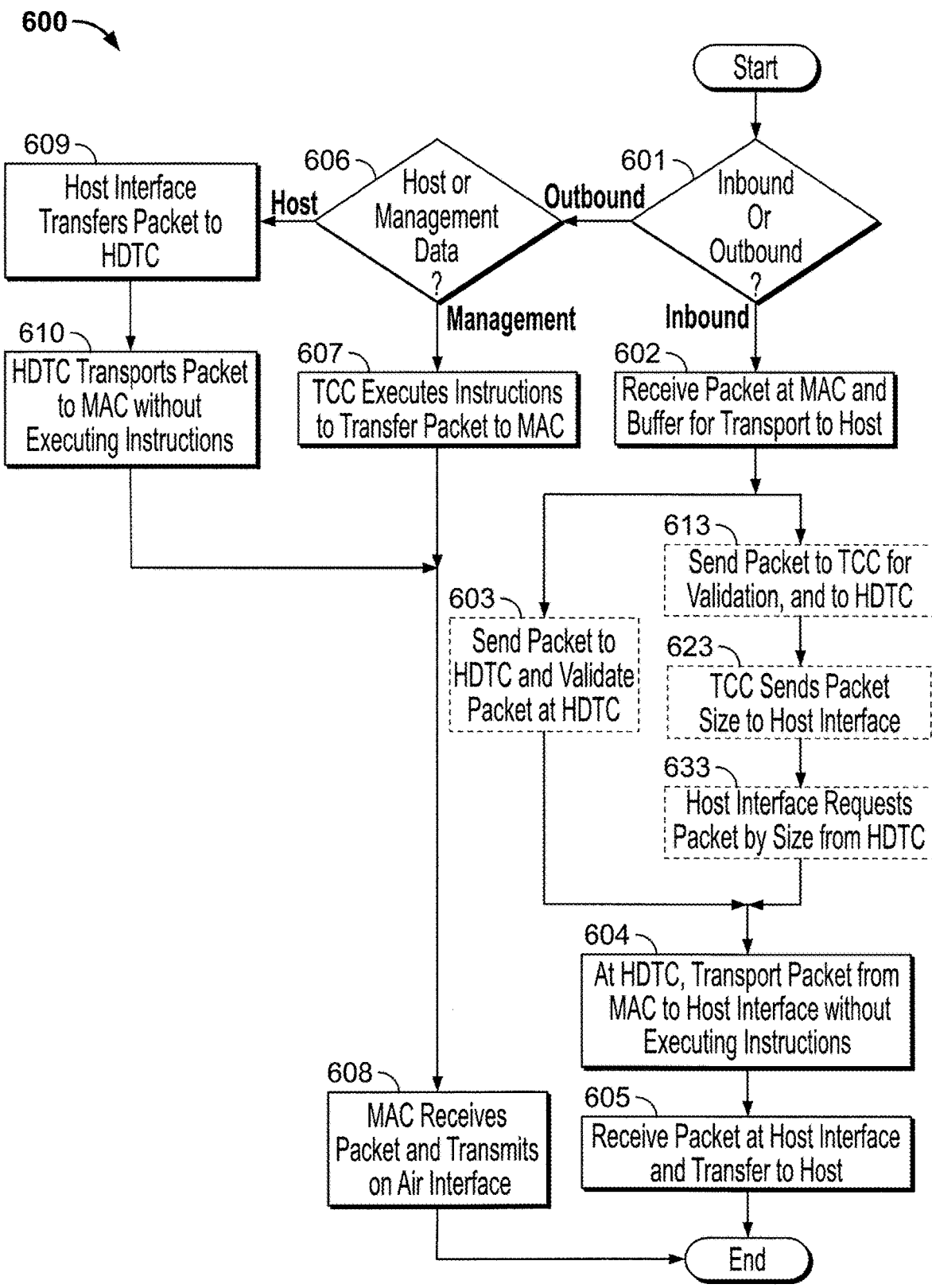
FIG. 6 is a flow diagram showing the operation of a transceiver in accordance with implementations of the subject matter of this disclosure.

FIG. 6 is a flow diagram showing the operation 600 of a transceiver in accordance with implementations of the subject matter of this disclosure.

At 601, it is determined whether a data packet to be processed is an inbound (i.e., received) packet or an outbound (i.e., to be transmitted) packet. For an inbound packet, at 602 the packet is received at media access controller 101 and buffered for transport to the host.

According to one alternative (as discussed above), at 603, the received packet is sent to hardware data transport circuitry 103, and validation is performed by hardware data transport circuitry 103.

According to one alternative (as discussed above), at 613 the received packet is sent to hardware data transport circuitry 103, and also is sent to transport controller circuitry 102 for validation. At 623, after validation, transport controller circuitry 102 sends the packet size (as determined during validation) to the host interface 104. At 633, host interface 104 then requests the packet from hardware data transport circuitry 103, specifying the amount of data requested based on the size information received at 623 from transport controller circuitry 102.

At 604, hardware data transport circuitry 103 transports the data packet from media access controller 101 to host interface 104 without executing any software or firmware instructions. At 605, the data packet received at host interface 104 is transferred by host interface 104 to the host and operation 600 ends.

If at 601 the packet is determined to be an outbound packet to be transmitted, then at 606 it is determined whether the packet data is from the host, or is management data generated by transport controller circuitry 102. If the packet is management data, then at 607 transport controller circuitry 102 executes software or firmware instructions to transfer the packet to media access controller 101. At 608, media access controller 101 receives the packet at transmits the packet on air interface 111 and operation 600 ends.

If at 606 the packet data is determined to be from the host, then at 609 host interface 104 transfers the packet to hardware data transport circuitry 103. At 610, hardware data transport circuitry 103 transports the packet to media access controller 101 based on logic in hardware data transport circuitry 103, without having to execute any software or firmware instructions. At 608, media access controller 101 receives the packet at transmits the packet on air interface 111 and operation 600 ends.

Thus it is seen that a system and method including hardware transport for faster handling of incoming data packets in a wireless transceiver has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A wireless data transceiver comprising:
a media access controller configured to receive an inbound data packet from an air interface and to buffer the inbound data packet for transport to a host, and to receive an outbound data packet from elsewhere in the wireless data transceiver and to transfer the outbound data packet to the air interface;
a host interface configured to receive the inbound data packet transported from the media access controller and to transfer the inbound data packet to the host, and to receive the outbound data packet from the host for transfer to the media access controller;
transport controller circuitry configured to manage the wireless data transceiver, including generating a management packet and transferring the management packet to the media access controller for transmission, the transport controller circuitry comprising processing circuitry configured to execute instructions, including instructions to perform the transferring of the management packet to the media access controller for transmission; and
hardware data transport circuitry for transporting the inbound data packet from the media access controller to the host interface, and for transporting the outbound data packet from the host interface to the media access controller, without executing instructions to perform the transporting of the inbound data packet or the transporting of the outbound data packet.

2. The wireless data transceiver of claim 1 wherein the transport controller circuitry comprises processing circuitry configured to execute instructions stored in firmware.

3. The wireless data transceiver of claim 2 wherein the processing circuitry is a central processing unit.

4. The wireless data transceiver of claim 2 wherein the processing circuitry is a microprocessor.

5. The wireless data transceiver of claim 2 wherein the processing circuitry is a microcontroller.

6. The wireless data transceiver of claim 1 further comprising:
buffer memory including a plurality of buffer locations configured to store inbound data packets and outbound data packets; and
address memory configured to store a pool of addresses of available buffer locations.

7. The wireless data transceiver of claim 6 wherein:
the hardware data transport circuitry comprises:
a transmit read pointer configured to select an address from the pool of addresses of available buffer locations, and to communicate the selected address to a transmit queue in the media access controller, and
memory circuitry configured to receive the outbound data packet from the host interface and to transfer the outbound data packet to a buffer location indicated by the transmit read pointer;
the media access controller is configured to:
read the outbound data packet from the buffer location as indicated by the selected address in the transmit queue,
transmit the outbound data packet to the air interface, and
release the selected address back to the pool of addresses; and
the hardware data transport circuitry further comprises a transmit write pointer configured to write the released address back into the pool of addresses.

8. The wireless data transceiver of claim 6 wherein:
the hardware data transport circuitry comprises a controller read pointer configured to select an address from the pool of addresses of available buffer locations;
the transport controller circuitry is configured to generate a management data packet for transfer to the air interface via the media access controller, to transfer the outbound data packet to a buffer location indicated by the controller read pointer, and to communicate the selected address to a transmit queue in the media access controller;

the media access controller is configured to:
read the controller data packet from the buffer location as indicated by the selected address in the transmit queue,
transmit the controller data packet to the air interface, and
release the selected address back to the hardware data transport circuitry; and
the hardware data transport circuitry further comprises a transmit write pointer configured to write the released address back into the pool of addresses.

9. The wireless data transceiver of claim 6 wherein:
the media access controller further comprises a receive read pointer configured to, upon receipt of the inbound data packet from the air interface, select at least one address from the pool of addresses;
the media access controller is configured to:
store the inbound data packet in a buffer at the at least one address,
add the at least one address to a receive queue, and
inform the hardware data transport circuitry that the inbound data packet has arrived, and to communicate the at least one address to the hardware data transport circuitry;
the hardware data transport circuitry comprises memory circuitry configured to:
read the inbound data packet from the buffer,
store the inbound data packet, and
forward to inbound data packet to the host interface;
the hardware data transport circuitry is further configured to release the at least one address to the media access controller; and
the media access controller further comprises a receive write pointer configured to write the released at least one address back to the pool of addresses.

10. The wireless data transceiver of claim 9 wherein:
the media access controller is further configured to inform the transport controller circuitry that the inbound data packet has arrived; and
the transport controller circuitry is configured to validate the inbound data packet.

11. The wireless data transceiver of claim 10 wherein:
the transport controller circuitry is configured to determine packet size of the inbound data packet and to inform the host interface of the packet size; and
the host interface is configured to request an amount of data from the hardware data transport circuitry based on the packet size.

12. A method of operating a wireless data transceiver including a media access controller, a host interface, transport controller circuitry and hardware data transport circuitry, the method comprising:
for an outbound management data packet generated at the transport controller circuitry:
at the transport controller circuitry,
executing instructions to transfer the management packet to the media access controller, and
at the media access controller, receiving the outbound management data packet and transferring the outbound data packet to the air interface; and
for an outbound data packet generated at a host:
at the host interface, receiving the outbound data packet for transport to the media access controller and transferring the outbound data packet to the hardware data transport circuitry,
at the hardware data transport circuitry, transporting the outbound data packet from the host interface to the media access controller, without executing instructions to perform the transporting of the outbound data packet, and
at the media access controller, receive an outbound data packet from elsewhere in the wireless data transceiver and transferring the outbound data packet to an air interface.

13. The method of claim 12 wherein the executing instructions comprises executing instructions stored in firmware.

14. The method of claim 12, further comprising, for an inbound data packet:
at the media access controller, receiving the inbound data packet from an air interface and buffering the inbound data packet for transport to a host;
at the hardware data transport circuitry, transporting the inbound data packet from the media access controller to the host interface, without executing instructions to perform the transporting of the inbound data packet; and
at the host interface, receiving the inbound data packet transported from the media access controller and transferring the inbound data packet to the host.

15. The method of claim 14 further comprising:
storing at least one of inbound data packets and outbound data packets in buffer memory including a plurality of buffer locations; and
storing a pool of addresses of available buffer locations.

16. The method of claim 15 further comprising:
selecting an address from the pool of addresses of available buffer locations, and communicating the selected address to a transmit queue in the media access controller, and
receiving the outbound data packet from the host interface and transferring the outbound data packet to a buffer location indicated by a transmit read pointer;
at the media access controller, reading the outbound data packet from the buffer location as indicated by the selected address in the transmit queue, transmitting the outbound data packet to the air interface, and release the selected address back to the pool of addresses; and
at the hardware data transport circuitry, writing the released address back into the pool of addresses.

17. The method of claim 15 further comprising:
selecting an address from the pool of addresses of available buffer locations, and communicating the selected address to a transmit queue in the media access controller;
at the transport controller circuitry, transferring the outbound management data packet to a buffer location indicated by a controller read pointer;
at the media access controller, reading the outbound management data packet from the buffer location as indicated by the selected address in the transmit queue, transmitting the outbound management data packet to the air interface, and releasing the selected address back to the hardware data transport circuitry; and
at the hardware data transport circuitry, writing the released address back into the pool of addresses.

18. The method of claim 15 further comprising:
at the media access controller, upon receipt of the inbound data packet from the air interface, selecting at least one address from the pool of addresses, storing the inbound data packet in a buffer at the at least one address, adding the at least one address to a receive queue, informing the hardware data transport circuitry that the inbound data packet has arrived, and communicating the at least one address to the hardware data transport circuitry;

at the hardware data transport circuitry, reading the inbound data packet from the buffer, storing the inbound data packet, forwarding the inbound data packet to the host interface, and releasing the at least one address to the media access controller; and at the media access controller, writing the released at least one address back to the pool of addresses.

19. The method of claim 14 further comprising:

informing the transport controller circuitry that the inbound data packet has arrived; and validating the inbound data packet at the transport controller circuitry.

20. The method of claim 19 wherein:

the validating comprises determining size of the inbound data packet; the method further comprising:

informing the host interface, by the transport controller circuitry, of the packet size; and requesting by the host interface, from the hardware data transport circuitry, of an amount of data based on the packet size.

\* \* \* \* \*